UNITED STATES PATENT OFFICE.

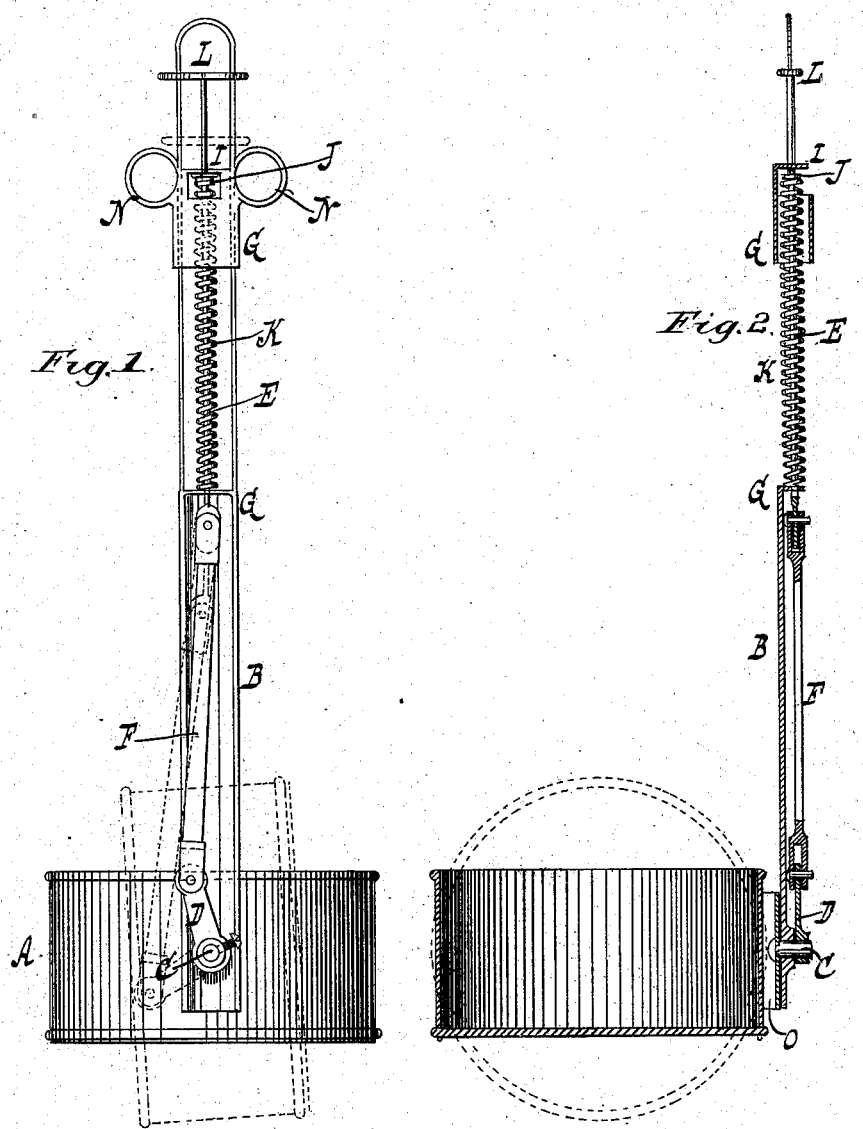

GEORGE T. PETERS, OF JERSEY CITY, NEW JERSEY.

DIPPER.

SPECIFICATION forming part of Letters Patent No. 296,051, dated April 1, 1884.

Application filed February 7, 1884. (No model.)

*To all whom it may concern:*

Be it known that I, GEORGE T. PETERS, a citizen of the United States, residing at Jersey City, in the county of Hudson and State of New Jersey, have invented new and useful Improvements in Dippers, of which the following is a specification.

The object of this invention is to permit the bowl of a dipper to be upset for emptying it without changing the position of the handle, my invention being especially adapted to milk-dippers, in which the handle extends up from the bowl to a considerable height, and in the use of which it has hitherto been necessary to swing the handle, together with the bowl, from an upright to a horizontal position. Said object of my invention I have accomplished by the novel means hereinafter described, and illustrated in the accompanying drawings, in which—

Figure 1 is a side view, looking in the direction of the back of the handle. Fig. 2 is a longitudinal section.

Similar letters indicate corresponding parts.

The letter A designates the bowl, and B the handle, of my dipper, pivoted together by means of a shaft, C, which is fixed to the bowl. On the end of this pivot-shaft C, where it projects from the handle B, is a crank, D, which is connected to a slide-rod, E, on the handle by means of a link, F, so that if a reciprocating motion is imparted to the slide-rod, a rotating motion is thence imparted to the pivot-shaft, together with the bowl A, through the medium of the crank. The slide-rod E is arranged in suitable guides, G, of the handle, and the angle or position of the crank D is such that in the downward motion of the slide-rod E the bowl A is turned from a horizontal to a vertical position, as indicated by dotted lines in Fig. 1, while in the upward motion of the slide-rod the bowl is returned to the horizontal or normal position. The upper position of the slide-rod E is determined by a stop, I, of the handle engaging a counter-stop, J, of the rod, and on the slide-rod is coiled a spring, K, which acts thereon with a tendency to force it upward, so that this spring practically operates to sustain the bowl in a normal position.

On the upper end of the slide-rod E is a thumb-piece, L, whereby the rod may be conveniently forced downward; and to support the fingers while this operation is being performed, the handle is provided with finger-rests N, in form of loops, which project laterally at a suitable distance below the thumb-piece.

In the example shown the pivot-shaft C is fixed to the bowl A through the medium of a plate, O, to produce a flat surface-contact between the bowl and the handle, and when this plate is used it or the handle may be provided with an anti-friction roller.

Modifications of my invention may be made— as, for example, the slide-rod E may engage the pivot-shaft C by means of a rack and pinion, or by any other suitable mechanical means, and the spring K may be arranged on the pivot-shaft.

What I claim as new, and desire to secure by Letters Patent, is—

1. The combination, in a dipper, of a bowl and handle pivoted together to render the bowl capable of rotating, a means, substantially such as herein described, for rotating the bowl, and a spring operating to sustain the bowl in a normal position.

2. The combination, in a dipper, of a bowl and handle pivoted together by means of a shaft which is fixed to the bowl, a slide-rod arranged on the handle to engage such pivot-shaft for rotating the bowl, and a spring operating to sustain the bowl in a normal position.

3. The combination, in a dipper, of a bowl and handle pivoted together by means of a shaft which is fixed to the bowl, a crank on such pivot-shaft, a slide-rod arranged on the handle, a link connecting the slide-rod to the crank of the pivot-shaft, and a spring coiled on the slide-rod to act thereon with a tendency to sustain the bowl in a normal position.

4. The combination, in a dipper, of a bowl and handle pivoted together by means of a shaft which is fixed to the bowl, a slide-rod arranged on the handle to engage such pivot-shaft for rotating the bowl, a spring operating to sustain the bowl in a normal position, a thumb-piece on the upper end of the slide-rod, and finger-rests projecting from the handle below such thumb-piece.

In testimony whereof I have hereunto set my hand and seal in the presence of two subscribing witnesses.

GEORGE T. PETERS. [L. S.]

Witnesses:
 E. F. KASTENHUBER,
 WILLIAM MILLER.